(12) United States Patent
Hilderbrand

(10) Patent No.: US 11,905,149 B2
(45) Date of Patent: Feb. 20, 2024

(54) MANHOLE COVER LIFTING DEVICE

(71) Applicant: Mag Lift, LLC, Sanford, FL (US)

(72) Inventor: Scott R. Hilderbrand, Mount Dora, FL (US)

(73) Assignee: Mag Lift, LLC, Sanford, FL (US)

( * ) Notice: Subject to any disclaimer, the term of this patent is extended or adjusted under 35 U.S.C. 154(b) by 73 days.

(21) Appl. No.: 17/490,904

(22) Filed: Sep. 30, 2021

(65) Prior Publication Data

US 2022/0098018 A1 Mar. 31, 2022

Related U.S. Application Data

(60) Provisional application No. 63/085,694, filed on Sep. 30, 2020.

(51) Int. Cl.
*B66F 19/00* (2006.01)
*B65G 7/12* (2006.01)

(52) U.S. Cl.
CPC .............. *B66F 19/005* (2013.01); *B65G 7/12* (2013.01)

(58) Field of Classification Search
CPC ................................ B66F 19/005; B65G 7/12
See application file for complete search history.

(56) References Cited

U.S. PATENT DOCUMENTS

| | | | |
|---|---|---|---|
| 2,952,373 A | 9/1960 | Bie | |
| 4,042,208 A * | 8/1977 | Arakaki | B62B 1/26 254/8 B |
| 4,802,702 A * | 2/1989 | Bownds | A47L 13/41 294/210 |
| 5,035,336 A * | 7/1991 | Schmitz | B66F 19/005 212/343 |
| 5,688,011 A * | 11/1997 | Gulley | B66C 1/18 294/74 |
| 5,741,037 A * | 4/1998 | Ewald | E03F 11/00 294/82.11 |
| D418,301 S * | 1/2000 | Anderson | D3/327 |
| 6,164,898 A | 12/2000 | Taylor | |
| 6,276,732 B1 | 8/2001 | Hauss | |
| 6,945,742 B2 | 9/2005 | Roberts | |
| 7,357,183 B2 | 4/2008 | Gazewood | |
| 7,544,035 B1 * | 6/2009 | Friedrich | B66F 19/005 254/8 R |
| 8,382,176 B2 * | 2/2013 | Meza | B66F 19/005 294/97 |
| 8,439,331 B2 * | 5/2013 | Shepherd | B62B 5/0089 254/1 |
| 10,421,653 B2 | 9/2019 | Poczciwinski | |

(Continued)

FOREIGN PATENT DOCUMENTS

CA 2155244 A1 2/1997

OTHER PUBLICATIONS

Greenadine Nutrition Store, "575lbs Fishing Magnets with Rope", https://www.amazon.com/Greenadine-Nutrition-Fishing-Magnet/dp/B07NP4NBBQ, (last accessed Feb. 25, 2022).

*Primary Examiner* — Seahee Hong
(74) *Attorney, Agent, or Firm* — The Webb Law Firm

(57) ABSTRACT

A device for lifting a metal cover may include a rope having a first end and a second end and a magnet connected to the first end of the rope. The magnet may be configured to be applied to a manhole cover, and upon applying an upward force to the second end of the rope, the magnet pulls the manhole cover upward.

14 Claims, 6 Drawing Sheets

(56) References Cited

U.S. PATENT DOCUMENTS

| | | | | |
|---|---|---|---|---|
| 2003/0235487 | A1* | 12/2003 | Roberts | B66C 1/06 414/490 |
| 2006/0202495 | A1* | 9/2006 | Takai | B66C 1/36 294/82.34 |
| 2007/0269267 | A1* | 11/2007 | Roberts | B66F 19/005 404/73 |
| 2012/0027559 | A1* | 2/2012 | Farbos | B66F 19/005 414/800 |

* cited by examiner

MANHOLE COVER LIFTING DEVICE

CROSS-REFERENCE TO RELATED APPLICATION

This application claims priority to U.S. Provisional Application Ser. No. 63/085,694, entitled "Manhole Cover Lifting Device" and filed on Sep. 30, 2020, the entire disclosure of which is hereby incorporated by reference in its entirety.

BACKGROUND OF THE INVENTION

Field of the Invention

This disclosure relates generally to a device for lifting manhole covers or other metallic covers and/or lids, including a system of multiple devices. Each device includes a magnet on one end which allows a user(s) to pull upward to move a manhole cover.

Description of Related Art

Manhole covers are very heavy, usually weighing at least 250 pounds. Therefore, the typical devices for moving or displacing manhole covers often involve large pieces of machinery and/or other equipment. These devices are bulky and can be difficult to operate, often taking a lengthy amount of time in order to remove a manhole cover from a manhole. These devices also have numerous parts, meaning there are numerous failure points that could potentially render the devices inoperable.

There is a need for a quick and easy way to move manhole covers. Having a device that can be quickly and repeatedly used on manhole covers will reduce the amount of time it takes to gain access to the manhole and reduce the amount of money spent on complex machinery needed to move the manhole cover.

SUMMARY OF THE INVENTION

According to one non-limiting embodiment of the present disclosure, a device for lifting a metal cover includes a rope including a first end and a second end and a magnet connected to the first end of the rope. The magnet may be configured to be applied to a manhole cover, and upon applying an upward force to the second end of the rope, the magnet may pull the manhole cover upward. The device may include a non-magnetic casing surrounding at least a portion of the magnet, so that only one surface of the magnet is exposed. The casing may include an eye. A hook may be configured to attach the eye to the rope. The rope may be sewn around the eye. The rope may further include a handle at the second end. The rope may be nylon. The rope may be four feet long.

According to another non-limiting embodiment of the present disclosure, a manhole cover lifting system may include a first lifting mechanism and a second lifting mechanism. The first lifting mechanism and second lifting mechanism may each include a rope and a magnet attached thereto. In order to lift a manhole cover, the magnets of the first lifting mechanism and the second lifting mechanism are placed on opposing points about the manhole cover, and an upward force applied to the ropes of the first lifting mechanism and the second lifting mechanism lifts the manhole cover.

According to another non-limiting embodiment of the present disclosure, the first lifting mechanism and the second lifting mechanism may further include a non-magnetic shell configured to receive at least a portion of the magnets therein. The shell may include an eye. The first lifting mechanism and the second lifting mechanism may further include a hook configured to connect the eye to the rope. The ropes may be sewn around the eyes. The ropes may include a handle at an end opposite that of the magnet. The ropes may be nylon. The ropes may be four feet long.

According to another non-limiting embodiment of the present disclosure, a method of lifting a manhole cover may include the steps of: connecting one end of at least one rope to at least one magnet, attaching the at least one magnet to a manhole cover, and lifting the end of the at least one rope opposite the at least one magnet upward. The at least one magnet may include a non-magnetic shell configured to receive the at least one magnet therein, so that only one surface of the at least one magnet is exposed. The non-magnetic shell may include an eye. A hook may be configured to connect the at least one rope to the eye of the non-magnetic shell.

The present disclosure may be further defined by the following clauses:

Clause 1. A device for lifting a metal cover, the device comprising: a rope comprising a first end and a second end; and a magnet connected to the first end of the rope, wherein the magnet is configured to be applied to the metal cover and, upon applying an upward force to the second end of the rope, the magnet pulls the metal cover upward.

Clause 2. The device of clause 1, further comprising a non-magnetic casing surrounding at least a portion of the magnet.

Clause 3. The device of clause 1 or 2, wherein the casing comprises an eye and a removal bar extending a length along the top of the eye.

Clause 4. The device of any of clauses 1-3, further comprising a hook configured to attach the eye to the rope.

Clause 5. The device of any of clauses 1-4, wherein the rope is sewn around the eye.

Clause 6. The device of any of clauses 1-5, wherein the rope further comprises a handle at the second end Clause 7. The device of any of clauses 1-6, wherein the rope is nylon.

Clause 8. The device of any of clauses 1-7, wherein the rope further comprises a second handle located between the first end and the second end.

Clause 9. A manhole cover lifting system comprising: a first lifting mechanism; and a second lifting mechanism, wherein the first lifting mechanism and the second lifting mechanism comprise a rope and a magnet attached thereto, wherein, in order to lift a manhole cover, the magnets of the first lifting mechanism and the second lifting mechanism are placed on opposing points about the manhole cover and an upward force applied to the ropes of the first lifting mechanism and the second lifting mechanism lifts the manhole cover.

Clause 10. The manhole cover lifting system of clause 9, wherein the first lifting mechanism and the second lifting mechanism further comprise a non-magnetic shell configured to receive at least a portion of the magnets therein.

Clause 11. The manhole cover lifting system of any of clause 9 or 10, wherein the shells comprise an eye.

Clause 12. The manhole cover lifting system of any of clauses 9-11, wherein the first lifting mechanism and the second lifting mechanism further comprise a hook configured to connect the eye to the rope.

Clause 13. The manhole cover lifting system of any of clauses 9-12, wherein the ropes are sewn around the eye.

Clause 14. The manhole cover lifting system of any of clauses 9-13, wherein the ropes further comprise a first handle at an end opposite that of the magnet.

Clause 15. The manhole cover lifting system of any of clauses 9-14, wherein the ropes further comprise a second handle between the magnet and an end of the rope opposite that of the magnet.

Clause 16. The manhole cover lifting system of any of clauses 11-15, wherein the ropes are four feet long.

Clause 17. A method of lifting a manhole cover, the method comprising the steps of: connecting one end of at least one rope to at least one magnet; attaching the at least one magnet to a manhole cover; and lifting the end of the at least one rope opposite the magnet upward.

Clause 18. The method of lifting a manhole cover of clause 17, wherein the at least one magnet includes a non-magnetic shell configured to receive at least a portion of the at least one magnet therein.

Clause 19. The method of lifting a manhole cover of clause 17 or 18, wherein the non-magnetic shell comprises an eye.

Clause 20. The method of lifting a manhole cover of any of clauses 17-19, wherein a hook is configured to connect the at least one rope to the eyes of the non-magnetic shells.

DETAILED DESCRIPTION OF THE DISCLOSURE

For purposes of the description hereinafter, the terms "upper", "lower", "right", "left", "vertical", "horizontal", "top", "bottom", "lateral", "longitudinal", and derivatives thereof shall relate to the disclosure as it is oriented in the figures. However, it is to be understood that the disclosure may assume alternative variations and step sequences, except where expressly specified to the contrary. It is also to be understood that the specific devices and processes illustrated in the attached drawings and described in the following specification are simply exemplary aspects of the disclosure. Hence, specific dimensions and other physical characteristics related to the aspects disclosed herein are not to be considered as limiting.

The term "at least" is synonymous with "greater than or equal to".

The term "includes" is synonymous with "comprises".

The present disclosure is directed to, in general, a metal cover lifting device. More specifically, the disclosure is directed to a manhole cover lifting device. Certain aspects of the components of each are illustrated in FIGS. 1A-4.

Figure 1A:
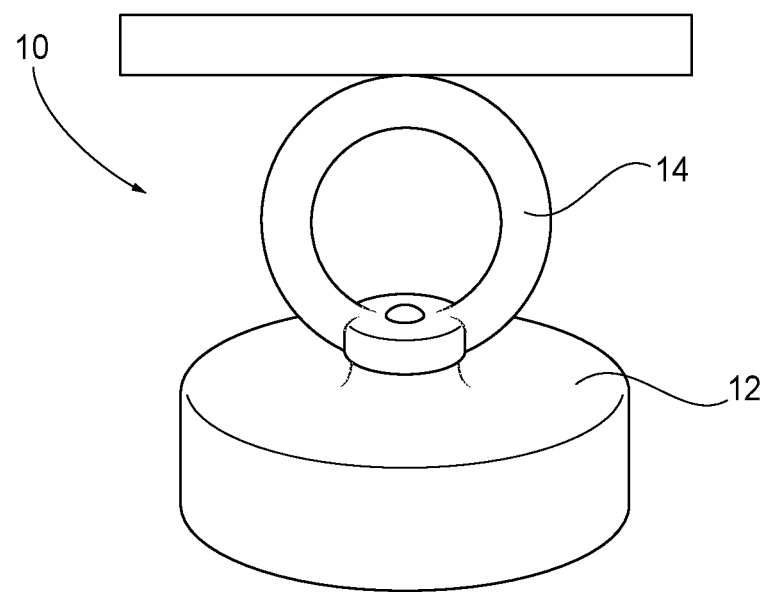
FIG. 1A is a perspective view of a magnet assembly of a manhole cover lifting device according to one embodiment of the present disclosure.
Figure 1B:
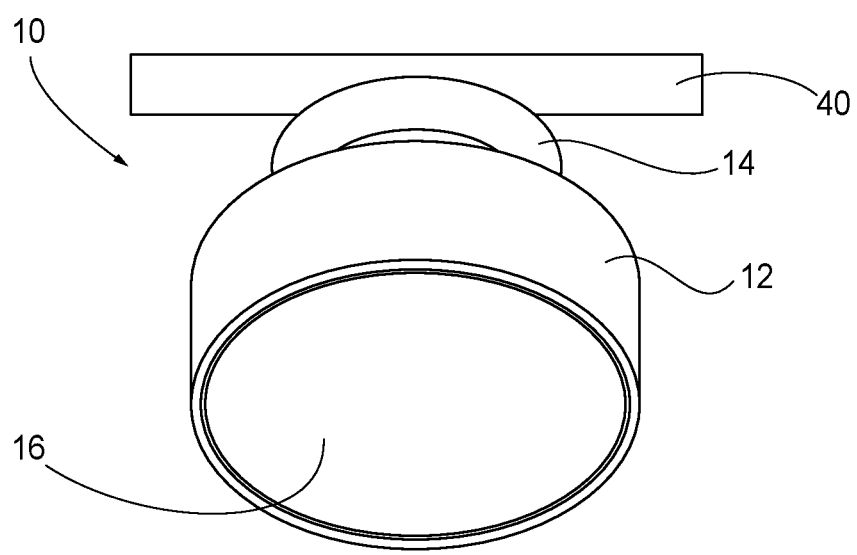
FIG. 1B is a bottom view of the magnet assembly of FIG. 1A.

Referring to FIGS. 1A and 1B, a magnet assembly 10 for a manhole cover lifting device 30 is shown. The magnet assembly 10 includes a casing 12 having an eye 14 on one end, and a magnet 16. A removal bar 40 is attached to and extends across a length along the top of the eye 14. The magnet 16, shown in FIG. 2, has a holding force of approximately 450 pounds, although other holding force values may be utilized depending on the total weight of the manhole cover 2. For example, magnets 16 having holding forces ranging from 250 pounds to 750 pounds may also be used. The magnet 16 may be a permanent magnet, always exhibiting magnetic properties. The magnet 16 can also be switchable or electrically charged, meaning an electrical current can pass through the magnet 16 in order for the magnet 16 to exhibit its magnetic properties. In this instance, a user of the manhole lifting device 30 can flip a switch (not shown) in order to activate the magnet 16. In this embodiment, electrical components may be located in the casing 12 or attached to the end of a rope 24 (discussed below) near the casing 12 in order to activate the magnet 16.

Figure 2:
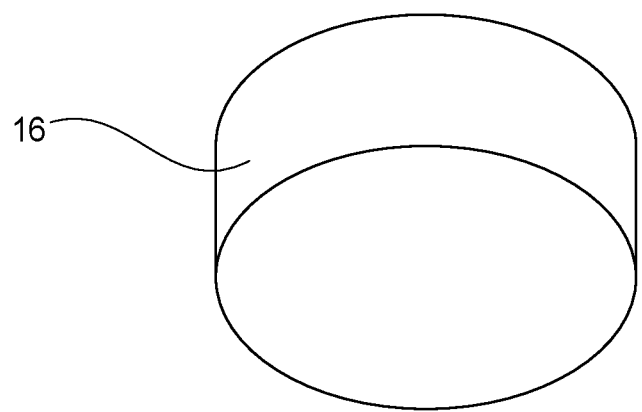
FIG. 2 is a perspective view of the magnet of the magnet assembly of FIGS. 1A and 1B.

As shown in FIGS. 1A-2, the magnet 16 and magnet assembly 10 are generally cylindrical, having a diameter of approximately 2.95 inches. However, it is contemplated that differently shaped magnets can be used. The magnet 16 and magnetic assembly 10 may have a diameter ranging from 1 to 4 inches, with the ultimate size depending on the holding forces needed from the magnet 16 during use. The magnet 16 may also be of a rectangular, square, conical, or any other shape capable of being used in the manner described herein. The magnet 16 may have differently sized diameters or lengths when non-circular shapes are used. The magnet 16 fits within the casing 12 so that only one face or surface of the magnet 16 is exposed. The casing 12 can be made of a non-magnetic material such as stainless steel, nickel, rubber, or a polymer material. The non-magnetic nature of the casing 12 helps to facilitate the handling of the magnet 16. In this configuration, only one surface of the magnet 16 can attach to the manhole cover 2. This makes the magnet 16 less likely to attach to unwanted metallic materials that, due to the high holding force of the magnet 16, may be difficult to undo. The configuration also makes it easier to control and properly direct the magnet 16 onto the manhole cover 2 during use. When using a non-magnetic casing 12, the magnet 16 may be fastened to the interior of the casing 12 by way of glue, a screw, or other fastening methods known to those having skill in the art. The casing 12 may also be made of a metallic or otherwise magnetic material. A metal casing 12 allows the magnet 16 to magnetically attach to the interior of the casing 12. It is also contemplated that the magnet 16 may be integral with or manufactured within the casing 12. In other words, the casing 12 and magnet 16 may be manufactured as one piece as opposed to being manufactured separately and later connected.

Figure 3:
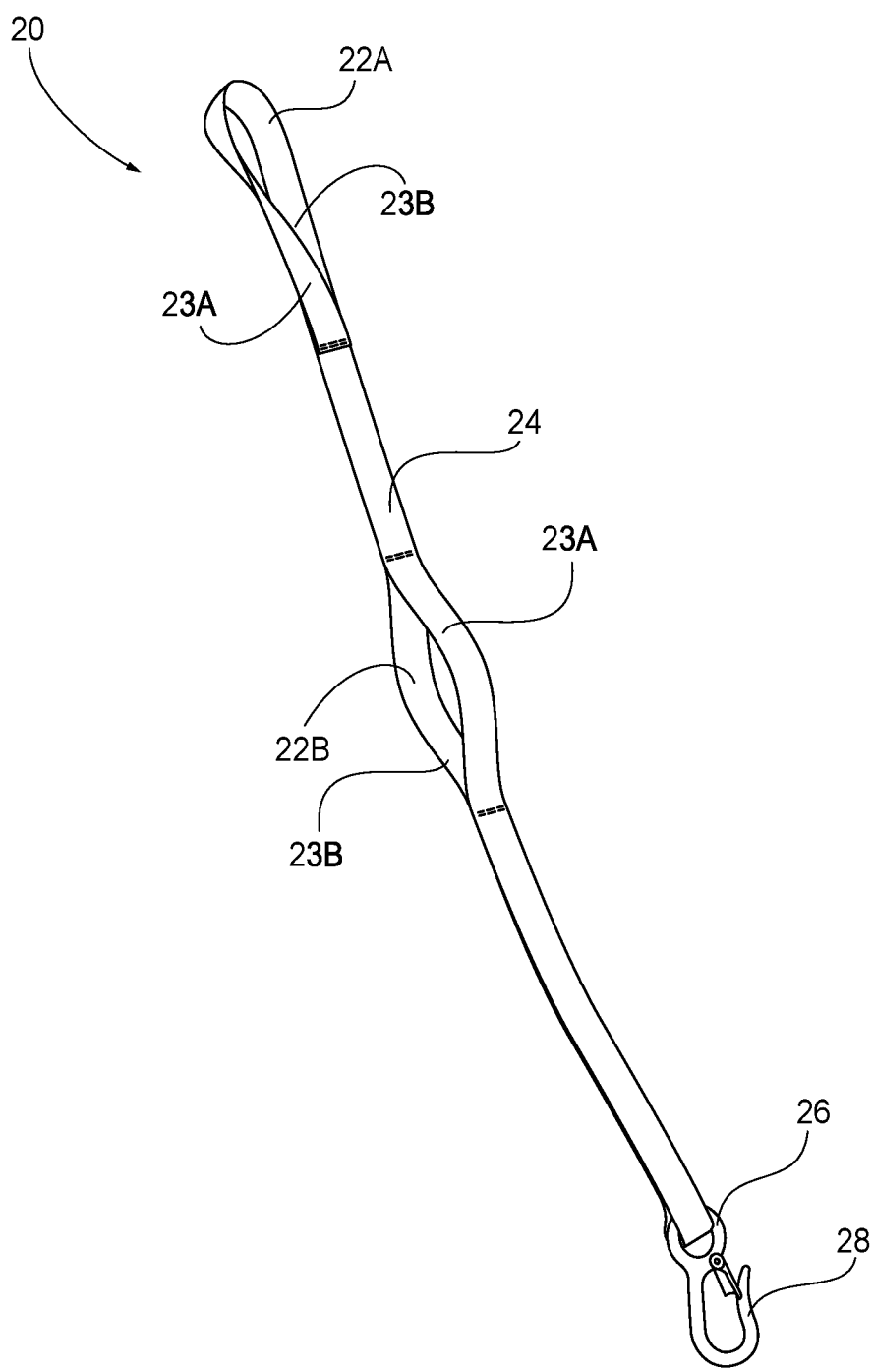
FIG. 3 is a perspective view of a rope and hook of a manhole cover lifting device.
Figure 4:
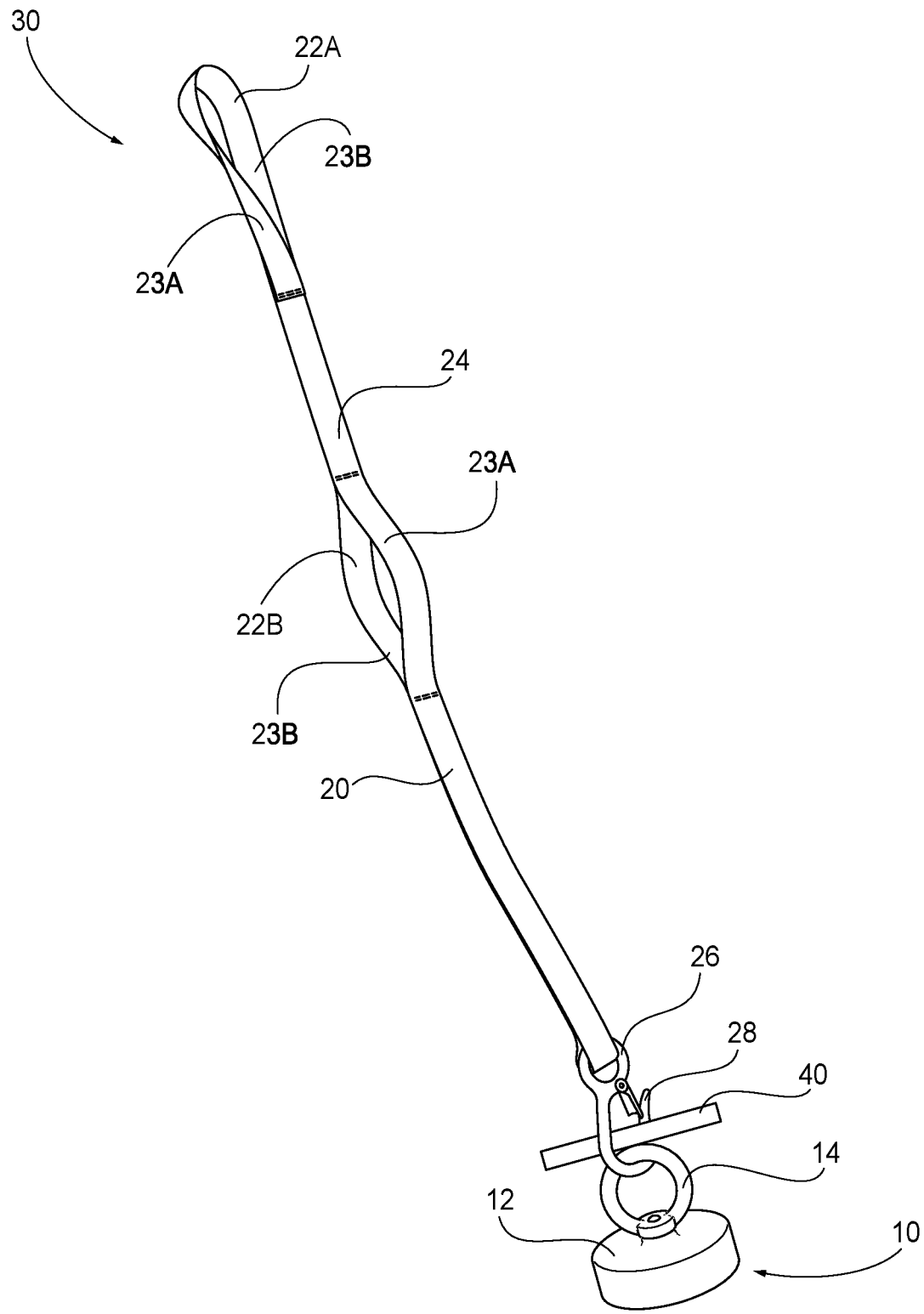
FIG. 4 is a perspective view of the manhole cover lifting device.
Figure 5:
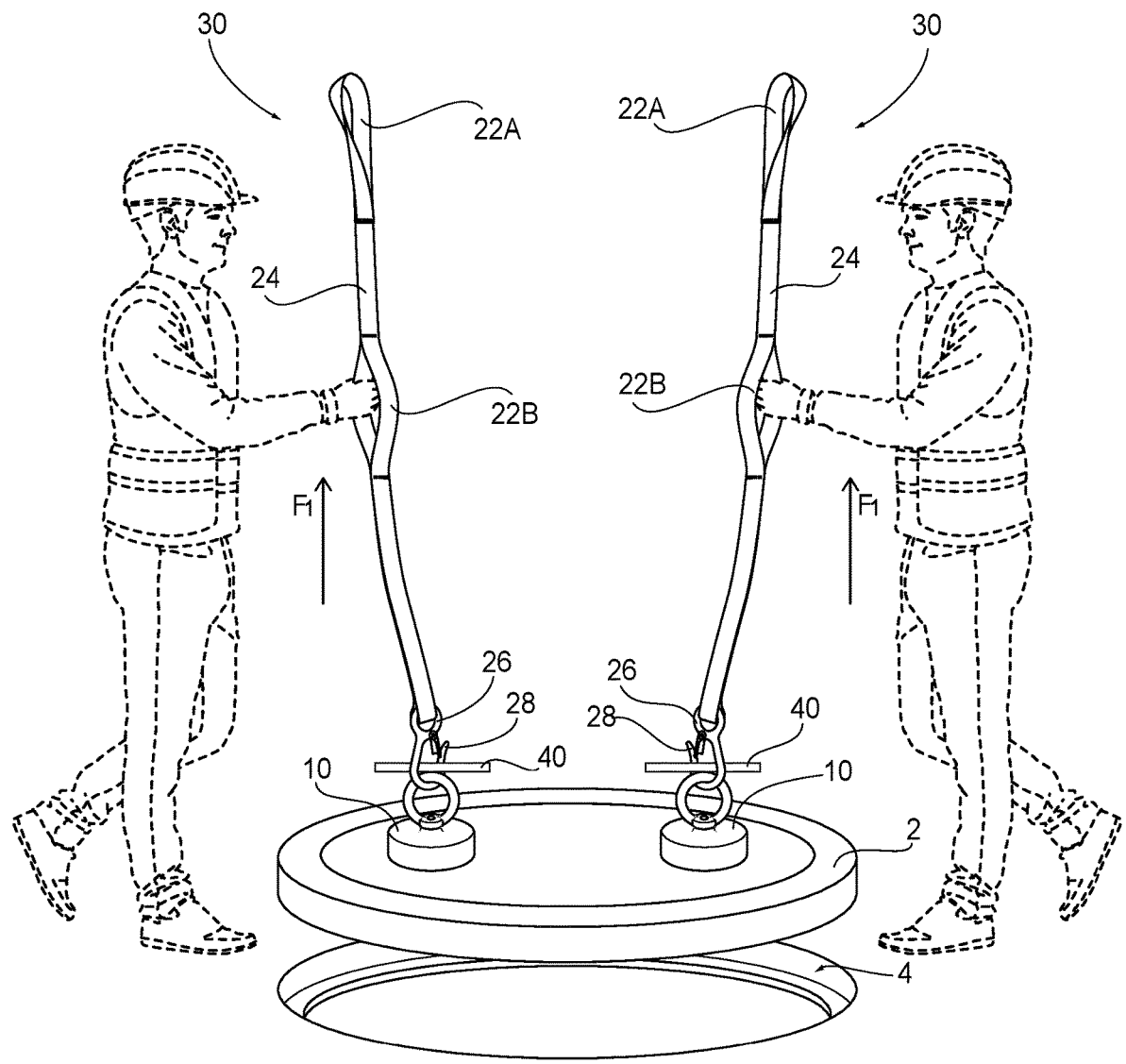
FIG. 5 is a view of two manhole cover lifting devices being applied to and lifting a manhole cover from a manhole

Referring to FIGS. 3-5, a lifting portion 20 of the manhole cover lifting device 30 is shown. The lifting portion 20 includes a rope 24 having a first handle 22A and a second handle 22B proximate one end of the rope 24. The rope 24 connects to the magnet assembly 10 at the end opposing the handles 22A, 22B. The rope 24 may be made of nylon, a composite material, or other materials known to those having skill in the art. The material of the rope 24 must be strong enough to lift the manhole cover 2 during use. For example, 750-pound nylon straps may be used as the rope 24. Other ropes may be used depending on the weight of the manhole cover 2. The strength of the rope 24 will be at least equal to the holding force of the magnet 16. Preferably, the strength of the rope 24 will be greater than the holding force of the magnet 16 to ensure the structural integrity of the lifting portion 20 of the manhole cover lifting device 30 during use.

The handles 22A, 22B may be integral with and made of the same material as the rope 24, as shown in the figures, or the handles 22A, 22B may be separate elements attached to the rope 24 utilizing methods known to those having skill in the art. In one embodiment, the first handle 22A may form the end of the rope 24 while the second handle 22B may be sewn or otherwise attached to a mid portion of the rope 24 so that it curls off and hangs from the main portion of the rope 24, of which the first handle 22A is a part, when not in use. The handles 22A, 22B are configured to allow a user to lift the manhole cover 2 by way of the rope 24. Users of the lifting device 30 are shown in dotted lines in FIGS. 5 and 6 and are not to be considered limiting.

The handles 22A, 22B are also configured to be gripped by a user to allow the magnet assembly 10 to properly align with the manhole cover 2. As shown, two handles 22A, 22B are provided within the rope 24 to allow users of different heights to comfortably lift the rope 24 and operate the manhole cover lifting device 30. The two handles 22A, 22B also provide different points at which a user can grip the rope 24, allowing a user to a pull the rope 24 over a greater distance or to obtain more leverage in engaging the rope 24 and assembly 10 handles 22A, 22B are formed by providing two sections 23A, 23B of rope 24 adjacent to one another in order to define a loop between those sections 23A, 23B. The two sections 23A, 23B of rope 24 are sewn or otherwise connected together at their respective ends to form the loop within the rope 24.

As shown, the first handle 22A is located at the opposite end of the rope 24 relative to the magnet assembly 10 while the second handle is placed at a location along the rope 24 that is closer to the magnet assembly 10. In this configuration, taller individuals may utilize the first handle 22A while shorter individuals may use the second handle 22B. The rope 24 may also be used with machinery (not shown) in order to lift the manhole. An example of this type of machinery may be a backhoe or other construction equipment. While only two handles 22A, 22B are shown, it is contemplated that additional handles may be used with each capable of being located at various points along the rope 24. Due to the heavy weight of the manhole cover 2, the handles 22A, 22B may have extra padding to facilitate easier handling of the manhole cover 2 and to cushion the force felt by a user as well as to provide extra support to the areas of the rope 24 most frequently handled. It is contemplated that the rope 24 is approximately four feet long, but other lengths of rope 24 may be used. The rope 24 may also be adjustable in length to account for different circumstances, such as users of the lifting devices 30 having different heights.

A hook 28 may be applied to the end of rope 24 opposite that of the handles 22A, 22B. The hook 28 includes a ring 26 that connects to the rope 24. The hook 28 itself connects to the eye 14 of the magnet assembly 10. The rope 24 may be sewn around the ring 26, ensuring that the hook 28 is connected to the rope 24 while being able to be attached to different magnet assemblies 10. In some instances, the hook 28 may not be used, and the rope 24 may be sewn directly around the eye 14 of the magnet assembly 10. The rope 24 may also be stapled, tied, or otherwise attached to the ring 26 or eye 14 using methods known to those having skill in the art. As shown, the hook 28 clips around the eye 14 and the removal bar 40 to ensure that the eye 14 and the removal bar 40 remain within the hook 28 during use of the manhole cover lifting device 30. The shape of the hook 28 is such that the eye 14 rests within the bottom portion of the hook 28.

The hook 28 possesses anti-slip properties in order to prevent the eye 14 from sliding out of the hook 28 during use. For example, the material of the hook 28 may have a rough outer surface so that frictional forces help to prevent the eye 14 of the magnet assembly 10 from slipping, sliding, or otherwise moving around within the hook 28. The hook 28 may also have an anti-slip cover (not shown) that may be made out of rubber or some other material that increases the frictional forces between the hook 28 and the eye 14. The shape of the hook 28 may be such that the eye 14 is always retained within a bottom portion of the hook 28 when an upward force is applied to the hook 28. For example, the bottom of the hook 28 may be parabolic in shape, so the eye 14 remains within the defined parabola during use of the manhole cover lifting device 30.

Referring now to FIG. 5, the process of lifting a manhole cover 2 using the manhole cover lifting device 30 will now be described. Two identical manhole cover lifting devices 30 are shown attached to a manhole cover 2. Each lifting device 30 is applied to generally opposing points about the circumference of the manhole cover 2. Specifically, it is the magnets 16 of each lifting device 30 that are connected to the generally opposing points about the circumference of the manhole cover 2. As will be discussed below, two users can each operate one of the lifting devices 30 to remove the manhole cover 2. However, other methods of operation are contemplated such as attaching one or more lifting devices 30 to construction machinery or other equipment so that the machinery can perform the work required to remove the manhole cover 2.

After the magnets 16 attach to the manhole cover 2, users can then apply an upward force F1 to each of the ropes 24 and handles 22A, thereby pulling the manhole cover 2 up from the manhole 4, so that access to the manhole 4 can be obtained. When applying the force F1, the users must generally apply the force simultaneously to their respective ropes 24 and handles 22A so that the manhole cover 2 is lifted evenly. The force F1 can be applied to the rope 24 specifically at the handles 22A or along another portion of the rope 24. As shown, two lifting devices 30 are used to lift the manhole cover 2; however, it is contemplated that any number of lifting devices 30 can be used to lift the manhole cover 2. For example, if only one lifting device 30 is used, it is contemplated that the lifting device 30 be placed on a central location of the manhole cover 2 so that the lifting force F1 can be applied in a manner to control the manhole cover 2 after it is lifted. It is also contemplated that a single lifting device 30 can be applied to the edge of the manhole cover 2 so that a lifting force F1 can be applied in an angled direction in order to drag the manhole cover 2 off of the manhole 4. In instances where a single lifting device 30 is to be used, the holding force of the magnet 16 must be strong enough to lift the manhole cover 2. If more than two lifting devices 30 are to be used, then each lifting device 30 may be arranged about the manhole cover 2 so as to evenly apply the lifting forces F1 to the manhole cover 2 so that it can be lifted in a controlled manner. For example, if three manhole lifting devices 30 are used, then the lifting devices 30 should be arranged in a generally triangular shape about the manhole cover 2. If four manhole lifting devices 30 are used, then the lifting devices should be arranged so as to form a generally square shape about the manhole cover 2.

Figure 6:
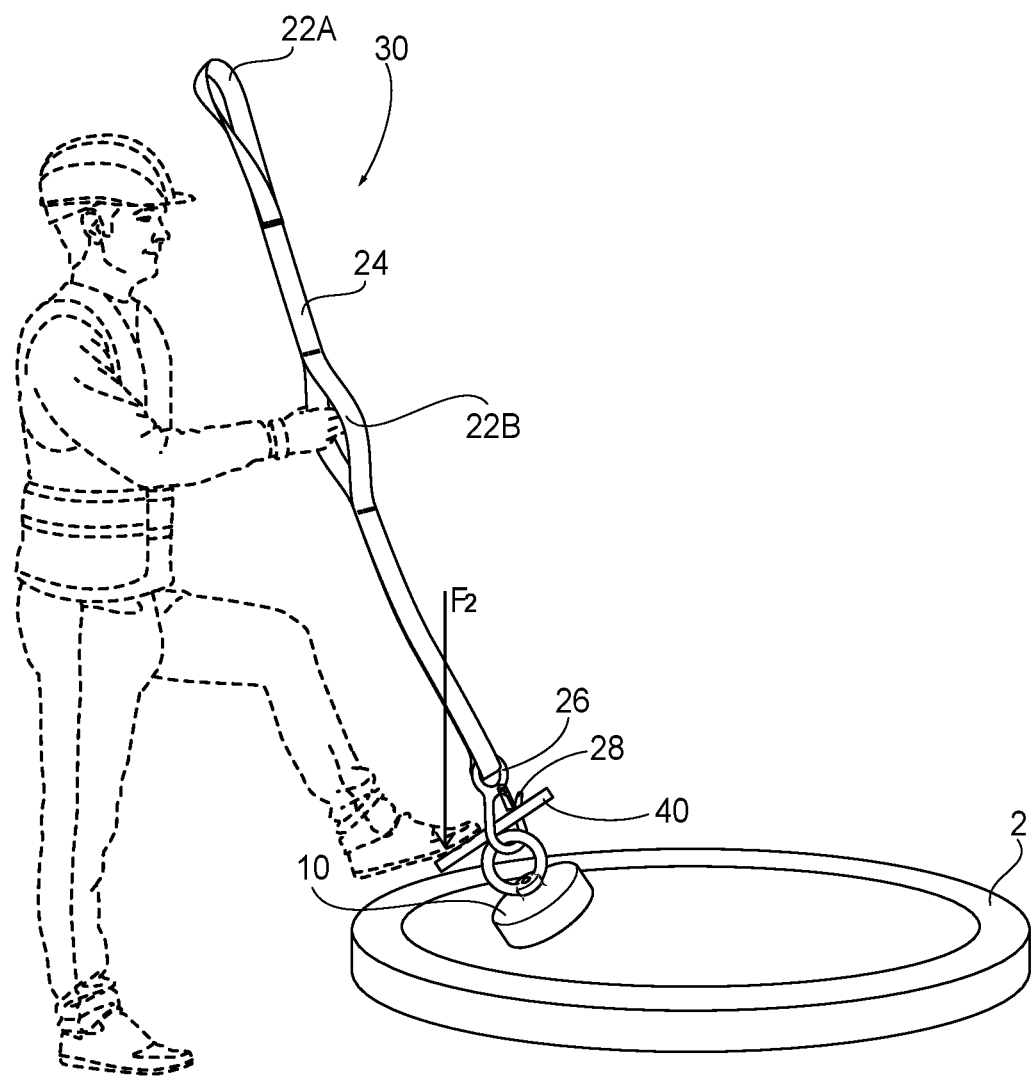
FIG. 6 is a view showing the removal of one manhole cover lifting device from the manhole cover.

Referring now to FIG. 6, the process of removing the magnet assembly 10 from the manhole cover 2 will now be described. When the magnet 16 and magnet assembly 10 are to be removed from the manhole cover 2, a user applies a force F2 to one end of the removal bar 40. The force F2 causes one end of the magnet assembly to tilt to one side, which forces the magnet 16 away from the manhole cover 2. This allows for the removal of the magnet 16 from the manhole cover 2 by gripping the end of the removal bar 40 to which the force F2 was not applied, which allows the user to move the manhole cover lifting device 30 away from the manhole cover 2. The force F2 must be strong enough to overcome the magnetic force acting between the magnet 16 and the manhole cover 2. However, the removal bar 40 and the magnet assembly 10 act as a lever. This means that the force F2 required to remove the magnet 16 from the manhole cover 2 is less than the magnetic force acting between the magnet 16 and the manhole cover 2. The longer the removal bar 40 is, the less force F2 is required to separate the magnet 16 and the manhole cover 2. The length of the removal bar 40 is such that a user can use their foot to step down on the removal bar 40 in order separate the magnet 16 from the manhole cover 2. It is also contemplated that the magnet assemblies 10 can be pushed or kicked off of the manhole cover 2 after the manhole cover 2 has been displaced and placed in a safe location. It is also contemplated that specific devices or machinery separate from the manhole cover lifting device 30 may be used in order to remove the manhole cover lifting devices 30 after their use.

While various aspects of the manhole cover lifting device 30 were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims, and all changes to the invention that fall within the meaning and the range of equivalency of the claims are to be embraced within their scope.

The invention claimed is:

1. A device for lifting a metal cover, the device comprising:
    a rope comprising a first end and a second end;
    a magnet connected to the first end of the rope;
    a non-magnetic casing surrounding at least a portion of the magnet, the non-magnetic casing comprising an eye; and
    a removal bar extending a length along a top of the eye,
    wherein the magnet is configured to be applied to the metal cover and, upon applying an upward force to the second end of the rope, the magnet pulls the metal cover upward, and
    wherein the removal bar is connected to the eye so that when the magnet is applied to the metal cover, the removal bar extends parallel to the metal cover.

2. The device of claim 1, further comprising a hook configured to attach the eye to the rope.

3. The device of claim 1, wherein the rope is sewn around the eye.

4. The device of claim 1, wherein the rope further comprises a first handle at the second end.

5. The device of claim 1, wherein the rope is nylon.

6. The device of claim 4, wherein the rope further comprises a second handle between the first end and the second end.

7. A manhole cover lifting system comprising:
    a first lifting mechanism; and
    a second lifting mechanism,
    wherein each of the first lifting mechanism and the second lifting mechanism comprises a rope, a magnet attached to the rope, a non-magnetic shell comprising an eye, and a removal bar attached to the eye,
    wherein the non-magnetic shells of the first lifting mechanism and the second lifting mechanism are configured to receive at least a portion of a respective magnet therein,
    wherein, in order to lift a manhole cover, the magnets of the first lifting mechanism and the second lifting mechanism are placed on opposing points about the manhole cover and an upward force applied to the ropes of the first lifting mechanism and the second lifting mechanism lifts the manhole cover, and
    wherein each of the removal bars are connected to a respective eye, so that when the magnets are applied to the manhole cover, the removal bars extend parallel to the manhole cover a length along a top of the respective eye.

8. The manhole cover lifting system of claim 7, wherein each of the first lifting mechanism and the second lifting mechanism further comprises a hook configured to connect the eye to the rope.

9. The manhole cover lifting system of claim 7, wherein each of the ropes is sewn around their respective eye.

10. The manhole cover lifting system of claim 7, wherein each of the ropes further comprises a first handle at an end opposite that of the magnet.

11. The manhole cover lifting system of claim 10, wherein each of the ropes further comprises a second handle located between the magnet and an end of the rope opposite that of the magnet.

12. The manhole cover lifting system of claim 7, wherein each of the ropes are four feet long.

13. A method of lifting a manhole cover, the method comprising the steps of:
    connecting one end of at least one rope to an eye of at least one non-magnetic shell, the at least one non-magnetic shell surrounding at least a portion of at least one magnet;
    attaching the at least one magnet to the manhole cover;
    lifting the end of the at least one rope opposite the magnet upward;
    placing the manhole cover at a desired location; and
    pressing on a removal bar that is connected to the magnet in order to remove the magnet from the manhole cover,
    wherein, when the magnet is attached to the manhole cover, the removal bar extends a length along a top of the eye and parallel to the manhole cover.

14. The method of claim 13, wherein a hook is configured to connect the at least one rope to the eye of the at least one non-magnetic shell.

* * * * *